United States Patent
Hayashi

[15] 3,668,987
[45] June 13, 1972

[54] ELECTRIC SHUTTER CONTROL CIRCUITRY

[72] Inventor: Toshio Hayashi, Osaka, Japan
[73] Assignee: Minolta Camera Kabushiki Kaisha, Minami-ku, Osaka, Japan
[22] Filed: Aug. 25, 1970
[21] Appl. No.: 66,766

[30] Foreign Application Priority Data
Aug. 29, 1969 Japan..................................44/68755

[52] U.S. Cl..................................95/11 R, 95/10 C, 95/53 E
[51] Int. Cl. ....................................................G03b 7/16
[58] Field of Search..................95/11 R, 53 E, 53 EA, 53 EB, 95/11.5 R, 10 C

[56] References Cited
UNITED STATES PATENTS

| | | |
|---|---|---|
| 3,535,989 | 10/1970 | Kitai..................................95/53 EB X |
| 3,478,660 | 11/1969 | Land..................................95/53 E X |
| 3,504,604 | 4/1970 | Kitai..................................95/10 C |

*Primary Examiner*—Samuel S. Matthews
*Assistant Examiner*—Robert P. Greiner
*Attorney*—Watson, Cole, Grindle & Watson

[57] ABSTRACT

First and second switches each having respective first and second switch positions establish shutter control by either a fixed timing circuit or a brightness measuring circuit in accordance with the setting of a distance adjustment ring. The contacts of the switches are mounted on a rotatable change over ring and the distance adjustment ring. The change over ring includes means for setting the flash guide number.

4 Claims, 2 Drawing Figures

PATENTED JUN 13 1972

3,668,987

INVENTOR
Toshio Hayashi

BY
Watson, Cole, Grindle & Watson
ATTORNEY

3,668,987

ELECTRIC SHUTTER CONTROL CIRCUITRY

BACKGROUND OF THE INVENTION

The present invention relates to a shutter control circuit which includes a changeover device for establishing exposure control either in accordance with a fixed time delay or a variable time delay determined by the brightness of the subject. Up to the present time, it has been well known that corresponding to daylight photography and the flash photography the operation of an electric shutter can be changed over to the exposure control corresponding to the brightness of an object (hereinafter this is called as EE exposure control) and to an exposure control in accordance with a fixed exposure time. However, when the photographic distance is at a large range, even though the diagram is fully opened flash photography is impossible. In such a case a warning lamp is lit or the release lock of the shutter is effected so as to prevent an exposure. However, it is desirable to effect shutter operation in such instances and the circuitry of the present invention enables a photograph to be taken.

SUMMARY OF THE INVENTION:

The primary object of the present invention is to provide a changeover device for operating an electric shutter, which even in the case of where the electric shutter is set to control the exposure time suitable for a flash photograph, automatically to effect EE exposure control by interlocking with the distance adjusting member of a camera if the distance is unsuitable for a flash photograph and effect a long time exposure through EE exposure control.

Further another object of the present invention is to provide a change over device for operating an electric shutter, which is adapted for operation of an automatic changeover member for interlocking with a photographing distance adjusting member and also interlocking with the setting of the guide number for a flash bulb.

Furthermore, another object of the present invention is to provide a changeover device for operating an electric shutter, which gives a warning when a changeover member is set on the flash photograph side and an automatic changeover member is changed over for EE photography in accordance with the setting up a distance adjustment member.

The above and other objects of the present invention will be more clearly understood from the embodiment described hereinafter.

DESCRIPTION OF THE PREFERRED EMBODIMENT

Figure 1:
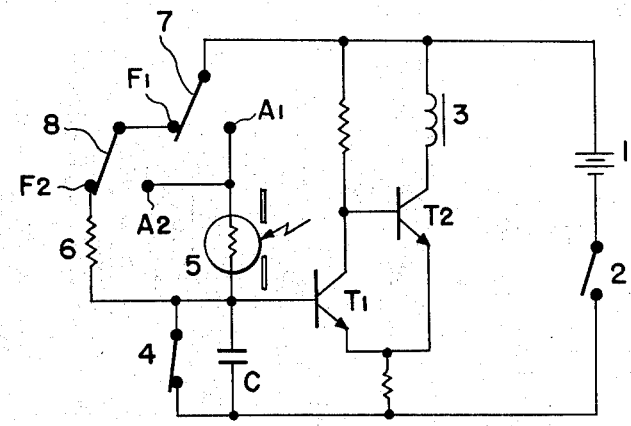
FIG. 1 is an electric circuit diagram of an embodiment of the changeover device for operating an electric shutter in accordance with the present invention.
Figure 2:
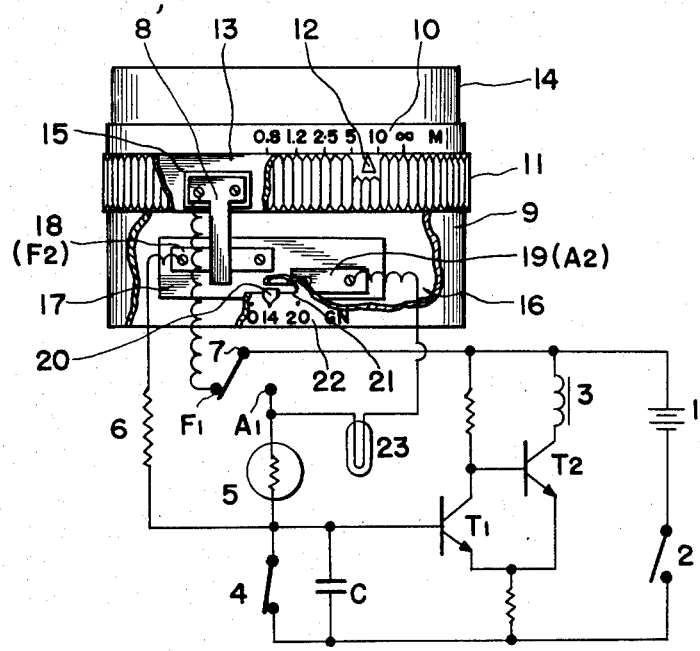
FIG. 2 is a combined top view and electric circuit diagram of another embodiment showing the formation of the essential portion of the changeover device for operating an electric shutter in accordance with the present invention.

FIG. 1 shows an embodiment of an electric circuit of a changeover device for operating an electric shutter in accordance with the present invention, wherein power source 1 and main switch 2 are closed at the first stage of the release operation and are connected to condenser C and timing switch 4 to which photoconductive element 5 and fixed resistance 6 are connected in parallel to each other so as to form a time constant circuit, through setup switch 7 and automatic changeover switch 8 which interlocks with distance adjusting ring 11 (see FIG. 2). And, the connection point of the time constant circuit is connected to the base of first transistor $T_1$ and the collector of first transistor $T_1$ is connected to the base of second transistor $T_2$ so as to form a Schmitt trigger switching circuit. In the collector of second transistor $T_2$ is an electromagnet 3 for restraining the starting of the shutter closing.

Changeover switch 7 is provided with two contacts $A_1$ and $F_1$, and when on the contact $A_1$ the time constant circuit composed of photoconductive element 5 and condenser C is connected to power source 1 and main switch 2, and when the changeover switch 7 is on the contact $F_1$ it is connected to automatic changeover switch 8 and interlocked with distance adjusting ring 11.

Automatic change over switch 8 also is provided with two contacts $A_2$ and $F_2$, and when on the contact $A_2$, in the same manner as contact $A_1$ for change over switch 7, the time constant circuit composed of photoconductive element 5 and condenser C is connected to power source 1 and main switch 2, and when automatic change over switch 7 is on the contact $F_2$ the time constant circuit of fixed resistance 6 and condenser C is connected to power source 1 and main switch 2 as long as automatic set up switch 7 is on the contact $F_1$.

The relative construction between the mechanical structure including the interlocking mechanism of distance adjusting ring 11 and automatic changeover switch 8, and the electric circuit is shown in FIG. 2, wherein on fixed lens barrel 9 distance adjusting ring 11 is rotatably mounted, and when the photographic distance is adjusted by means of index 12 and range marker 10 on fixed lens barrel 9 movable lens barrel 14 moves back and forth to adjust the focus of an objective lens as is well known in the art.

On the internal circumference of distance adjusting ring 11 ring 13 is mounted, and on ring 13 contact piece 8' for automatic changeover switch 8 is provided through insulating plate 15 and connected to contact $F_1$ for changeover switch 7 mounted on the camera body side through a lead wire.

Further, on the inside of fixed lens barrel 9 ring 16 is provided and through insulating plate 17 on ring 16 contact plate 18 and contact plate 19, which are parallel and insulated from each other are mounted. Contact plate 18 on the short range side of range marker 10 is connected to fixed resistance 6 by a lead wire to form contact $F_2$, and contact plate 19 on the long range marker side forms contact $A_2$ connected to photOconductive element 5 by a lead wire through pilot lamp 23 described later. Contact piece 8' slides on contact plates 18, 19 to contact with one or the other in accordance with the rotation of distance adjusting ring 11.

When a flash bulb having a guide number is used ring 16 can be fixed to fixed lens barrel 9, however, ring 16 is arranged to be rotatable relative to fixed lens barrel 9 so as to accommodate flash bulbs having different guide numbers. In order to facilitate the rotation of ring 16, knob and index 22 is provided projecting from transverse slot 21 formed on lens barrel 9, so as to face guide number scale 22 on lens barrel 9.

Since the present invention is formed as described above, when taking a photograph in daylight changeover switch 7 is connected to the contact $A_1$. And thus, simultaneously with the release operation, first, main switch 2 is closed and electromagnet 3 for restraining the closing operation of the shutter is operated, and then simultaneously with the opening of the shutter timing switch 4 is opened and condenser C is charged by the electric current running though photoconductive element 5. And, when condenser C reaches a threshold voltage both transistors $T_1$ and $T_2$ are switched and electromagnet 3 is demagnetized to start the shutter closing operation, and accordingly the EE photograph is effected in accordance with the brightness of an object.

And, when taking a flash photograph, first, knob 20 is set to the guide number scale for the flash bulb being used, and then changeover switch 7 is put on contact $F_1$ and distance adjusting ring 11 is adjusted to correspond to the correct photographic distance. In this case, when the distance is short and within the range possible to take a flash photograph, automatic changeover switch 8 comes into contact with contact plate 18 and accordingly contact $F_2$ is connected so that the time constant circuit composed of fixed resistance 6 and condenser C is connected to power source 1 and main switch 2. Main switch 2 is closed by the release operation so that electromagnet 3 is excited through second transistor $T_2$ to restrain the shutter closing operation, and through the subsequent release operation timing switch 4 is opened simultaneously with the shutter opening operation and condenser C is charged by the power current running through fixed resistance 6. And, when condenser C reaches a threshold voltage, in the same manner as described hereinbefore the switching circuit is reversed and electromagnet 3 is demagnetized to start the shutter closing operation. In this case, the resistance value of fixed resistance 6 is set so that the delay time may be one-thirtieth second which is suitable for a flash photograph.

In that situation, however, when the distance is long contact piece 8' of automatic changeover switch 8 moves from contact plate 18 (contact $F_2$) to contact plate 19 (contact $A_2$) and fixed resistance 6 is disconnected, and instead photoconductive element 5 and condenser C are connected. Therefore, the exposure time in this case is long as a matter of course, however, the proper exposure for a dark object is effected.

By the way, in the embodiment circuit shown in FIG. 2, in the circuit connecting contact plate 19 to photoconductive element 5 pilot lamp 23 is inserted, and by means of lighting the photographer is warned the long exposure so as to prevent the camera from shaking, swinging, etc..

I claim:

1. A shutter control circuit for a photographic camera, comprising:
    a distance adjusting member;
    an automatic changeover member mounted adjacent said distance adjusting member;
    a brightness measuring circuit including a photoconductive element and a condenser connected in series with one another;
    a resistance connected to said condenser in series for establishing a shutter speed suitable for flash photography;
    a first switch and a second switch each having first and second contact positions, said first positions of said first and second switches actuating said resistance and condenser to establish a fixed shutter delay;
    said first switch in said first position and said second switch in said second position actuating said brightness measuring circuit to control the actuation of said shutter in accordance with the brightness of the object; said first switch in said second position controlling the actuation of said shutter in accordance with the brightness of the object; said first switch is actuated manually and said second switch is positioned by said automatic changeover member and said distance adjusting member.

2. A shutter control circuit as set forth in claim 1, wherein said automatic changeover member includes means for setting a flash guide number, and further including a contact connected to said photoconductive element and a contact connected to said resistance; and said distance adjusting member includes a movable contact engageable with said contacts of said change over member for establishing said first and second switch positions.

3. A shutter control circuit as set forth in claim 1, further comprising:
    a pilot lamp connected to said photoconductive element and actuated with said first switch and said second switches in said second positions and said distance adjustment member set to a distance indicating flash ineffectiveness.

4. A shutter control circuit as set forth in claim 1, wherein said distance adjusting member is composed of a distance adjusting ring rotatable about the fixed lens barrel of the camera, and said automatic changeover member is rotatable about said fixed lens barrel and composed of a ring having a guide number indicator, and contact members mounted on said changeover ring respectively connected to said photoconductive element and said resistance.

* * * * *